July 14, 1953 D. H. PRITCHARD 2,645,713
GATING TRIGGER CIRCUIT
Filed Oct. 27, 1950
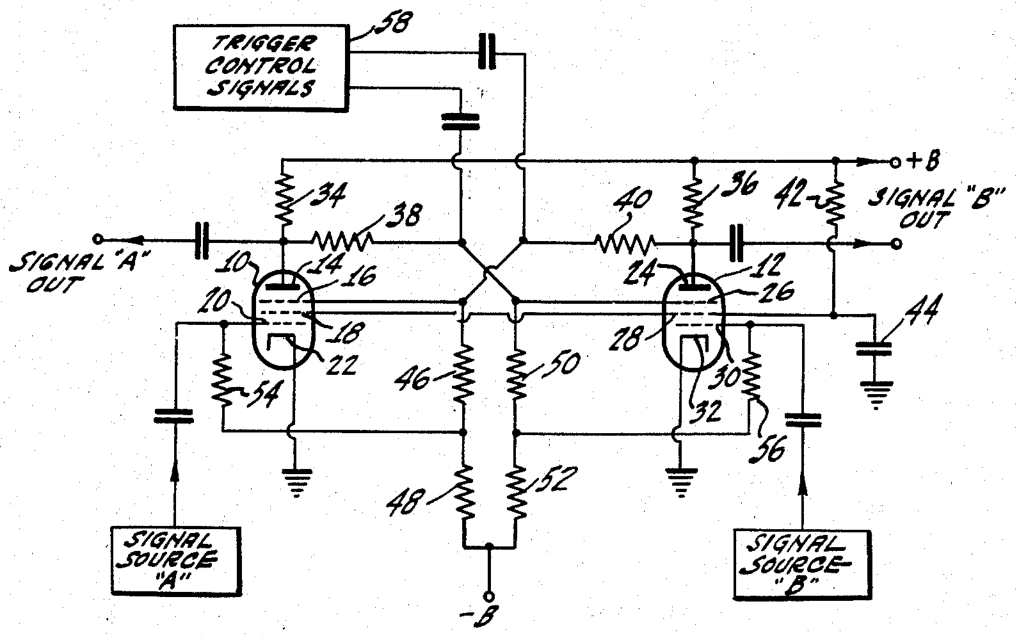
INVENTOR
DALTON H. PRITCHARD
BY Morris A. Rabkin
ATTORNEY Patented July 14, 1953

2,645,713

UNITED STATES PATENT OFFICE 2,645,713

GATING TRIGGER CIRCUIT

Dalton H. Pritchard, Princeton, N. J., assignor to Radio Corporation of America, a corporation of Delaware Application October 27, 1950, Serial No. 192,470

3 Claims. (Cl. 250—27)

This invention relates to trigger circuits and more particularly to trigger circuits used as electronic switching devices.

Electronic switches are known in the art wherein a free-running multivibrator, which can be synchronized with an external signal, has its output applied to a pair of electronic gates to open them alternately to permit passage of signals which are applied to the gates. Where random alternate switching is desired a bistable state type of trigger circuit is used in place of the free running multivibrator. Such switches require a minimum of four electron discharge devices, two for switching signals and two for gating. A more economical and simpler electronic switch could be constructed if it were possible to eliminate the electronic gates and have the multivibrator or trigger circuit itself perform both the gating and amplification functions performed by presently known electronic switches.

In a patent to James R. Weiner, No. 2,502,687, for "Multivibrator and Control of Same" there is described a free-running multivibrator circuit which performs both the gating and amplification functions. Signals to be gated and amplified are applied to the cathodes of the two tubes comprising the multivibrator and signals to synchronize the gating action are applied to the control grids of the multivibrator. In order to obtain such operation Weiner provides diodes which serve as a charging path for the multivibrator cross-coupled condensers other than the grid-to-cathode impedance of the tubes. Other diodes serve to block the charging paths through the grid-to-cathode impedances. This provides a multivibrator in which each section may operate as a class A amplifier because the control grids can operate at a negative potential. It should be noted that besides requiring diodes as extra circuit elements the device of Weiner is a free-running one which is synchronized, not controlled by the externally applied synchronizing pulses. The device does not permit random keying of two signal channels. Such keying is a desirable feature in many applications. One such is the diversity combining action required in a dual diversity receiving system which is random in nature.

It is therefore an object of my present invention to provide a novel and improved combined gating and trigger circuit.

It is a further object of my present invention to provide a simpler and more inexpensive combined gating and trigger circuit than heretofore.

It is still a further object of my present invention to provide a simple and inexpensive combined gating and trigger circuit which permits random operation.

These and other objects of my present invention are achieved by using a trigger circuit of the D. C. coupled, cross-connected Eccles-Jordan type which has two stable conditions. The tubes used in the trigger circuit are pentodes and the triggering action is obtained by cross-connecting the anode and suppressor grids of the tubes. The anode, suppressor grids and control grids of each tube are connected to various points of two voltage dividers which are across a source of operating potential. The values of the resistors of the voltage divider are such that potentials are applied to the suppressor grids and anodes to maintain the trigger circuit stable with conduction in either one of the two tubes. Further, a Class A operating bias is applied to the control grids in the one of the two tubes which is made conducting to permit it to operate as an amplifier. Switching signals are applied to the suppressor grids and the signals to be keyed and amplified are applied to the control grids.

The novel features of the invention as well as the invention itself both as to its organization and method of operation will best be understood from the following description when read in connection with the accompanying drawing, which shows a circuit diagram of an embodiment of the invention.

In the drawing there may be seen a gating trigger circuit consisting of a first electron discharge tube 10 and a second electron discharge tube 12. Each has an anode load resistor 34, 36, connecting its anode 14, 24 to a source of B+ or operating potential. The anode 14 of the first tube 10 is connected to the suppressor grid 26 of the second tube 12 through a coupling resistor 38. The anode 24 of the second tube 12 is connected to the suppressor grid 16 of the first tube 10 through a coupling resistor 40. The screen grids 18, 28 of both tubes are connected together and to the source of B+ through a single resistor 42. They are also bypassed to ground through a condenser 44. Two resistors 46, 48 connected in series connect the first tube suppressor grid 16 to a negative bias source or B—. The control grid 20 of the first tube 10 is connected, through a grid lead resistor 54, to the junction of the two series connected resistors 46, 48. Another two series-connected resistors 50, 52 connect the suppressor grid 26 of the second tube 12 to the negative bias source. The control grid 30 of the second tube is connected through a grid lead resistor 56 to the junction of this other two series connected resistors 50, 52. The cathodes 22, 32 of both tubes are convected to ground or to a point of reference potential.

A source of trigger control signals 58 supply negative pulses to the suppressor grids. The trigger circuit connections in the drawing are those of an Eccles-Jordan type of trigger circuit which utilizes the cut-off characteristics of the suppressor grid of a pentode tube as a control element. Operation of the Eccles-Jordan trigger circuit using a suppressor grid as the control element may be found fully described on pages 54–56 of a book published by John Wiley and Sons, Inc., called "Time Bases," by O. S. Puckle. The circuit shown in the drawing distinguishes over the conventional Eccles-Jordan type of trigger circuit in the types of bias applied to the screen grids and to the control grids by reason of the values selected for the two voltage dividers formed by the anode resistors 34, 36 coupling resistors 38, 40 and two series-connected resistors 46, 48 and 50, 52, and the unique disposition of such voltage dividers for the obtention of such bias permitting hitherto totally unexpected and useful additional uses to be obtained from the trigger circuit.

The circuit shown, by reason of its connections and the values chosen for its components, has two stable operating conditions. One condition results in the first tube 10 at cut-off and the second tube 12 conducting. The application of a negative pulse to the second tube suppressor grid 26 serves to trigger the circuit so that the second tube is cut off, applying a relatively positive potential from its anode 24 to the first tube suppressor grid 16, causing this tube to conduct and to apply a relatively negative potential to the second tube suppressor grid 26. Application of a negative pulse to the first tube suppressor grid 16 restores conduction to the second tube again and cut off conduction in the first tube.

For an explanation of the operation of the gating trigger circuit, assume that the circuit is stable with the second tube conducting and the first tube essentially cut off. The anode potential of the first tube is then close to B+. The values of the voltage divider components are selected to be such, however, that the suppressor grid 26 of the second tube 12 is left at ground or cathode potential, this being its normal operating value. The remaining values of the two series connected resistors 50, 52 to which the control grid 30 of the second tube 12 is connected are such that a normal Class A operating bias is applied to the control grid. Therefore the second tube can operate in its Class A region and signals applied to its grid from signal source B are amplified and may be derived from the second tube anode 24. By a Class A operating bias is meant a negative bias which permits the tube to have anode current flowing at all times. The first tube 10, by reason of the negative potential applied to its suppressor grid 16 is at cut off and no signals will be passed through it from signal source A coupled to its control grid 20.

If a negative pulse is applied to the suppressor grid of the second tube sufficient to cut it off and cause the first tube to become conductive, then, by reason of the values selected for the voltage divider bias source, the suppressor grid 16 of the first tube is placed at cathode potential, a Class A operating bias is placed on the control grid 20 of the first tube and it then serves as an amplifier for the signals from the signal source A connected to its grid. Signals from signal source B are no longer passed through the second tube. Thus, the gating trigger circuit serves to gate and amplify the signals from sources A and B at random or in accordance with the frequency of the triggering signals from the control source 58. Needless to say, the signals from the signal sources A and B should not be of an amplitude sufficient to drive the tube to which they are applied to cut off, since this will have the effect of transferring tube conduction. The circuit may also be used to gate one signal as desired with no additional circuitry. The source of operating potential may be a single source of potential which ranges in value above and below the reference potential point or ground potential.

From the foregoing description it will be readily apparent that I have provided an improved gating trigger circuit that is simple and economical and permits a random gating of signals. Although a single embodiment of my present invention has been shown and described, it will be apparent that changes may be made in the particular embodiment herein disclosed, and that other embodiments are possible, all within the spirit and scope of the invention. Therefore, it is desired that the foregoing description shall be taken as illustrative and not as limiting.

What is claimed is:

1. A system for random alternate amplification of signals from two signal sources comprising a trigger circuit including a first and a second electron discharge tube each having an anode, a cathode, a control grid and a suppressor grid, a first and a second three-tap voltage divider, means to apply an operating potential across said first and second voltage dividers, said first and second tube anodes being respectively connected to a first tap on said first and second three-tap voltage dividers, said first and second tube suppressor grids being respectively connected to a second tap on said second and first three-tap voltage divider, said first and second tube control grids being respectively coupled to a third tap on said second and first three-tap voltage dividers, means establishing a point of reference potential, the cathodes of said first and second tubes being connected to said point of reference potential, the values of impedances of said first and second voltage dividers being determined to provide potentials at said first and second taps to maintain said first and second tubes stable with conduction in either one of said tubes and to provide a potential at said third taps such that a Class A bias is applied to the control grid in a conducting one of said first and second tubes, means coupling each of said two signal sources to each of said control grids and means to apply trigger control signals to said suppressor grids to transfer conduction between said first and second tubes.

2. A gating trigger circuit comprising a pair of electron discharge tubes each having an anode, a cathode, a control grid, and a suppressor grid, means coupling the suppressor grid of one of said tubes to the anode of the other of said tubes and the anode of said one of said tubes to the suppressor grid of said other of said tubes, means to apply a bias to each of said suppressor grids to maintain said trigger circuit stable with conduction in said one or said other of said tubes, said bias being substantially equal to cathode potential in the conducting one of said tubes, means coupled to said bias applying means to apply a Class A operating bias to the one of said control grids which is in a conducting one of said electron discharge tubes, means to apply signals to be amplified to each of said control grids, means to derive an amplified signal output from each of said anodes and means to apply triggering signals to said suppressor grids to cause transfer of conduction between tubes together with transfer of amplification of signals applied to the control grids.

3. A system for random alternate amplification of signals from two signal sources comprising a first and a second electron discharge tube each having an anode, a cathode, a control grid, a screen grid and a suppressor grid, a pair of anode load resistors each connected to one of said tube anodes, a pair of coupling resistors, one of which is connected between said first tube anode and said second tube suppressor grid, the other of which is connected between said second tube anode and said first tube suppressor grid, a pair of two series connected resistors, each of said pair having one end connected to one of said suppressor grids and the other end connected together, a first resistor coupling said first tube control grid with the junction between the two series connected resistors which is the one of said pair which is connected to said first tube screen grid, a second resistor coupling said second tube control grid with the junction between the two series connected resistors which is the other one of said pair, means establishing a point of reference potential to which the cathodes of said first and second tubes are connected, means to apply an operating potential having values above and below said point of reference potential to said anode load resistors and the connected together end of said pair of two series connected resistors, said pair of anode load resistors, pair of coupling resistors and pair of two series-connected resistors having values determined to provide potentials to maintain said first and second tubes stable with conduction in either tube and to apply a substantially reference potential to the suppressor grid in a conducting one of said first and second tubes and to apply a class A bias to the control grid in the conducting one of said first and second tubes, means to apply signals from each of said two signal sources to each of said control grids, means to derive an output from each of said anodes, and means to apply trigger control signals to said suppressor grids to transfer conduction between said first and second tubes.

DALTON H. PRITCHARD.

References Cited in the file of this patent

UNITED STATES PATENTS

| Number | Name | Date |
|---|---|---|
| 2,448,336 | Weiner | Aug. 31, 1948 |
| 2,534,232 | Cleeton | Dec. 19, 1950 |

OTHER REFERENCES

"Time Bases" by Puckle, December 19, 1947; pages 54 to 57.